(12) United States Patent
Kwan

(10) Patent No.: US 7,320,207 B2
(45) Date of Patent: Jan. 22, 2008

(54) HORSE RUG WITH ELASTIC INSERT

(76) Inventor: Yan Chi Kwan, Unit 2004, Nam Wo Hong Building. 148 Wing Lok Street, Sheung Wan, Hong Kong (HK)

( * ) Notice: Subject to any disclaimer, the term of this patent is extended or adjusted under 35 U.S.C. 154(b) by 148 days.

(21) Appl. No.: 11/210,600

(22) Filed: Aug. 24, 2005

(65) Prior Publication Data

US 2006/0042200 A1    Mar. 2, 2006

Related U.S. Application Data

(60) Provisional application No. 60/604,294, filed on Aug. 25, 2004.

(51) Int. Cl.
   B68C 5/00     (2006.01)
   A01K 13/00    (2006.01)

(52) U.S. Cl. ........................ 54/79.1; 119/850

(58) Field of Classification Search ............... 54/79.1, 54/79.2, 79.4; 119/850; 2/141.2
   See application file for complete search history.

(56) References Cited

U.S. PATENT DOCUMENTS

| | | | |
|---|---|---|---|
| 4,114,352 A * | 9/1978 | Horton et al. ............ 54/79.1 |
| 4,214,421 A | 7/1980 | Battle et al. |
| 4,823,540 A | 4/1989 | Kosarek |
| 4,955,182 A | 9/1990 | Newman |
| 5,125,220 A | 6/1992 | Martin |
| 5,161,352 A | 11/1992 | Schneider et al. |
| 5,271,211 A | 12/1993 | Newman |
| 5,361,563 A | 11/1994 | Llamas |
| 5,456,215 A | 10/1995 | Deutscher et al. |
| 5,839,395 A | 11/1998 | Kelley et al. |
| 6,851,394 B1 * | 2/2005 | Young ..................... 119/850 |
| 2002/0043054 A1 | 4/2002 | Gatto |
| 2003/0061790 A1 | 4/2003 | Longtin |
| 2003/0159410 A1 | 8/2003 | Van Campenhoudt |

FOREIGN PATENT DOCUMENTS

| EP | 0 595 423 B1 | 7/1997 |
|---|---|---|
| EP | 1 121 854 A1 | 8/2001 |

* cited by examiner

*Primary Examiner*—Rob Swiatek
(74) *Attorney, Agent, or Firm*—Chan Law Group LLP

(57) ABSTRACT

A horse rug provides one or more flex control extender inserts for animal accessories permitting the accessory to flex with the animal while conforming to the animal. In a horse rug or blanket, stable blanket, turnout cover or other named horse cover, the flex control extenders may be used along the neck opening at the withers and or at the shoulders or any suitable combination. A horse rug according to the present disclosure may be suitable for use in rugs or blankets with or without neck hoods.

9 Claims, 2 Drawing Sheets

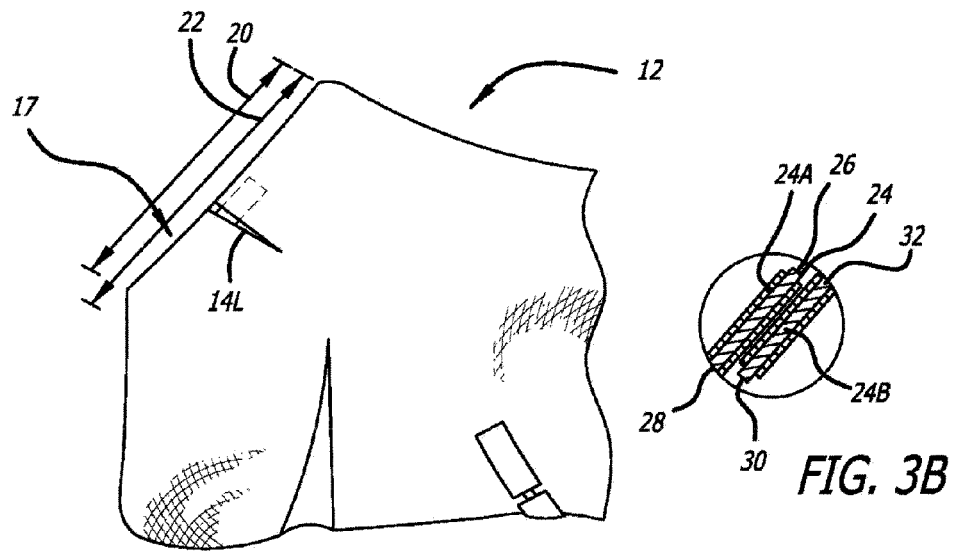
FIG. 3A
FIG. 3B
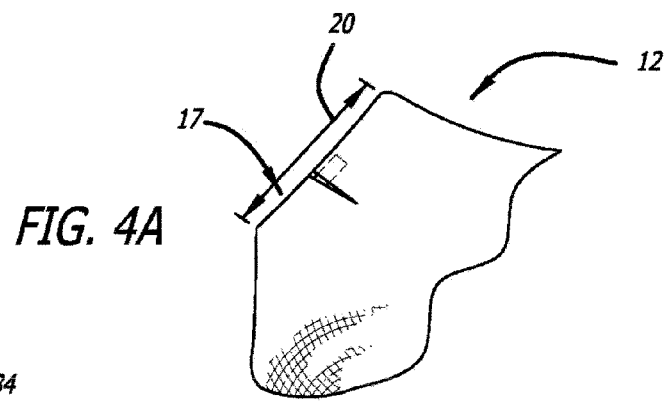
FIG. 4A
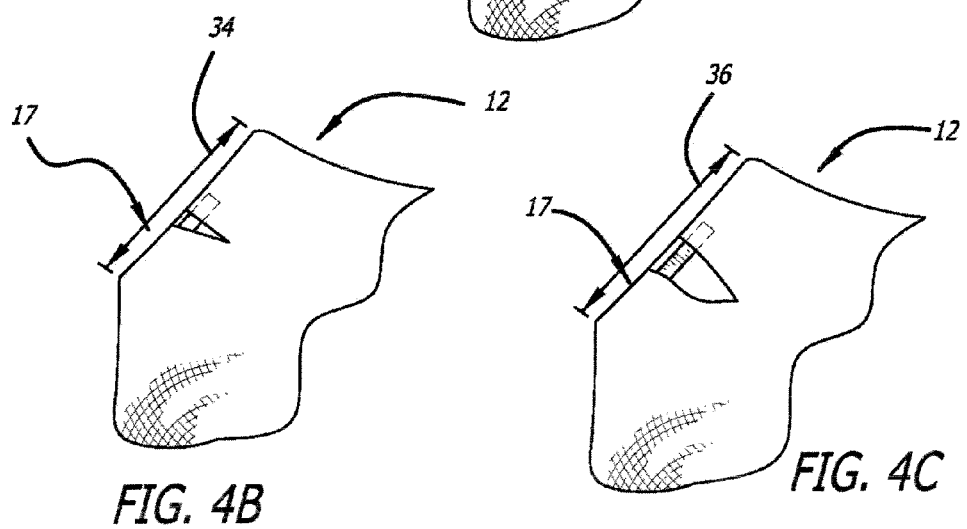
FIG. 4B
FIG. 4C

HORSE RUG WITH ELASTIC INSERT

CROSS REFERENCE TO RELATED APPLICATIONS

The application claims priority to Provisional Application 60/604,294 filed Aug. 25, 2004.

BACKGROUND OF THE INVENTION

1. Field of the Invention

This invention relates to animal husbandry accessories, and more specifically to horse blankets or rugs to minimize discomfort for the animal outfitted with a rug or blanket according to the present disclosure.

2. Description of the Prior Art

Despite their size and obvious strength, horses are delicate animals with a complicated physiology. Some existing blankets or rugs used for horses do not accommodate the flexibility of a horse's neck. The lack of flex in horse rugs may result in stress to the neck muscles of the horse. Many horse rugs have adjustable closures that allow for differing sizes of neck openings, see for example U.S. Pat. No. 5,161,352 to Schneider et al. issued Nov. 10, 1992. Other horse rugs have a neck opening formed completely of a stretchable material, see U.S. Pat. No. 5,271,221 to Newman issued Dec. 21, 1993. Still other horse rugs have a neck opening secured by an elastic closure, see U.S. Pat. No. 5,839,395 to Kelly et al. issued Nov. 24, 1998.

However, the above mentioned horse rugs do not have a neck opening of a material that is appropriate for the purpose of providing protection to a horse and yet has sufficient flexibility to conform to the horse as the horse moves without imparting stress to the horse's musculature. Although the invention described herein relates to a horse rug, the invention is especially applicable to rugs, blankets, or coverings for animals other than horses.

SUMMARY OF THE INVENTION

In a first aspect, the present disclosure provides one or more flex control inserts for animal accessories permitting the accessory to flex with the animal while conforming to the animal. In a horse rug or blanket, stable blanket, turnout cover or other named horse cover, the flex control elements may be used along the neck opening at the withers and or at the shoulders or any suitable combination. A horse rug according to the present disclosure may be suitable for use in rugs or blankets with or without neck hoods.

In another aspect, the present disclosure includes one or more extendable insert in a rug, blanket, stable blanket, turnout cover or other named cover for a horse. The one or more extendable inserts permit the animal cover to flex and expand or contract with the covered animal while minimizing muscle stress for the covered animal. The one or more extendable inserts may be made of any suitable material such as elastic, elasticized fabric, spandex, various polymers, or springs.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

FIG. 3A is a side view of the horse rug of FIG. 1.

FIG. 3B is a cross-sectional view of extenders included in shoulder slit of FIG. 3A.

FIG. 4A is a side view of the horse rug of FIG. 1.

FIG. 4B is a side view of the horse rug of FIG. 4A with slight extension of an insert according to the present invention.

FIG. 4C is a side view of the horse rug of FIG. 4A with full extension of an insert according to the present invention.

DETAILED DESCRIPTION OF THE PREFERRED EMBODIMENT(S)

Figure 1:
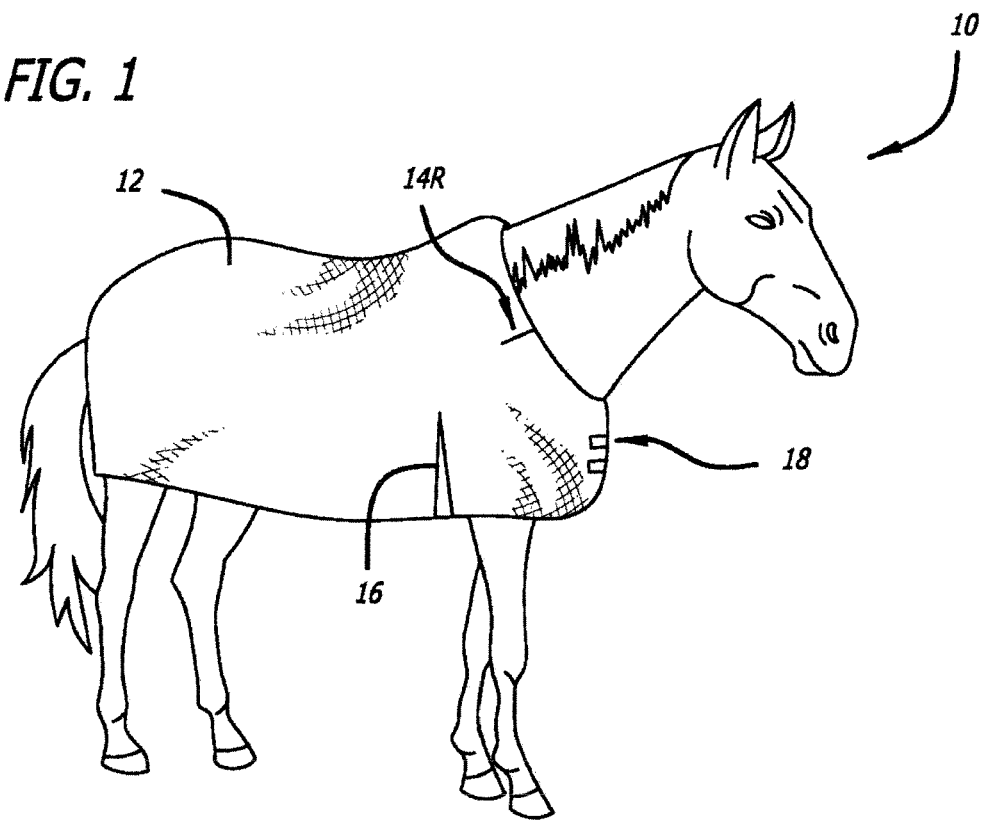
FIG. 1 is aside view of an animal equipped with a horse rug according to the present invention.

Referring now to FIG. 1, animal 10 is equipped with horse rug 12 according to the present disclosure. Rug 12 may be constructed of many different materials and have a number of different names such as blanket, stable blanket, turnout cover or other named cover for a horse. For the purposes of this disclosure, a horse rug will be discussed and it is understood that all other suitable flexible animal covers may incorporate the present disclosure.

Figure 2:
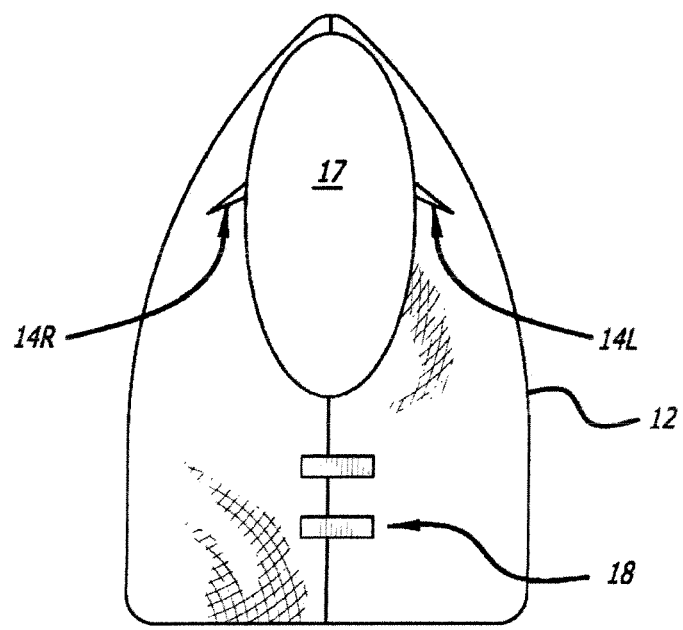
FIG. 2 is a front view of the horse rug of FIG. 1.

As shown in FIG. 1, rug 12 may incorporate one or more openings or slits such as openings 14R, 14L and 16 as well as suitable closure apparatus 18. FIG. 2 shows a front view of horse rug 12 having neck openings and slits 14R and 14L. In one embodiment of the present disclosure, openings such as opening 14R may include one or more flexible extenders such as extenders 24 shown on FIG. 3. In one embodiment of the present disclosure, expansion slits such as right shoulder slit 14R are included in matching pairs. Shoulder slit 14R has a matching shoulder slit 14L on the opposite side of opening 17. Other suitable numbers of slits and location geometries for the slits may be used.

Referring now to FIG. 3A, rug 12 includes opening 17 which generally accommodates the neck of a horse. Opening 17 may further include two or more extension slits such as shoulder slit 14L. Extension slits such as shoulder slit 14L permit expansion of opening 17 from minimum dimension 20 to maximum dimension 22. In one embodiment of the present disclosure, extenders 24 are included in extension slits such as shoulder slit 14L to resist the extension of shoulder slit 14L.

Referring now to FIG. 3B, extender 24 comprises a resilient material enclosed by a fabric material identical to, similar to, or compatible with the fabric material of the horse rug. The enclosure may be formed as a tube of material open at each end, and one end of the enclosure, the fixed end 26 or 30, may be secured to one side of slit 14L. The opposite end, the running end 28 or 32, is not fixed to the other side of slit 14L. The resilient material is disposed within the tube of material and the resilient material is secured to each side of slit 14L to retain slit 14L in a closed position. A force may be applied causing the resilient material to stretch or increase in length in at least one direction. The force may be caused by the movement of the animal 10, FIG. 1. When the force is removed, the resilient material returns to it original size. The resilient material may be any suitable material such as elastic, elasticized fabric, spandex, various polymers, or springs. Because the resilient material is enclosed within a fabric tube, the resilient material does not contact the animal 10, FIG. 1.

Extenders 24 may be used in pairs such as extender 24A and extender 24B. Extenders such as extender 24A include fixed end 26 and running end 28. Extender 24B includes fixed end 30 and running end 32. When extenders are used in pairs they may be used in opposite directions such as running end 28 of extender 24A located adjacent fixed end 30 of extender 24B, and fixed end 26 of extender 24A located adjacent running end 32 of extender 24B. Any other suitable configuration may also be used.

Referring now to FIG. 4A, FIG. 4B and FIG. 4C, rug 12 is shown extending opening 17 from length 20 to length 34 and then to length 36. Expansion of opening 17 is accomplished using one or more expansion slits such as shoulder slit 14L.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A rug for a four legged animal comprising:
   a body of blanket material defining a neck opening,
   wherein the neck opening is provided with a plurality of expansion slits, each expansion slit being defined by a first edge and a second edge, and each expansion slit having at least one extender,
   wherein each of the at least one extender further comprises a fabric tube having a first and a second open end and resilient material disposed therein,
   wherein the first open end of each of the at least one extender is fixedly secured to either the first edge or the second edge of each of the plurality of expansion slits, and
   wherein the resilient material is fixedly secured to the first edge and second edge of each of the plurality of expansions slits thereby securing each of the plurality of expansion slits in a closed position.

2. The rug of claim 1, wherein the at least one flexible extender completely covers the area defined by the first edge and the second edge of each expansion slit.

3. The rug of claim 1, wherein the at least one flexible extender partially covers the area defined by the first edge and the second edge of each expansion slit.

4. The rug of claim 1, wherein each of the plurality of expansion slits is arranged substantially perpendicular to the edge of the neck opening.

5. The rug of claim 1, wherein the resilient material is elastic.

6. The rug of claim 1, wherein the resilient material is an elasticized fabric.

7. The rug of claim 1, wherein the resilient material is a spring.

8. The rug of claim 1, wherein the resilient material is a polymer.

9. The rug of claim 1, wherein the at least one extender comprises two extenders.

* * * * *